May 22, 1923.

R. W. McNEILL

TURBINE WATER WHEEL

Filed Nov. 16, 1920

1,456,322

2 Sheets-Sheet 1

Witness

Inventor
R. Wallace McNeill
by his attorneys

May 22, 1923.

R. W. McNEILL

TURBINE WATER WHEEL

Filed Nov. 16, 1920

1,456,322

2 Sheets-Sheet 2

Patented May 22, 1923.

1,456,322

UNITED STATES PATENT OFFICE.

RODERICK WALLACE McNEILL, OF BOSTON, MASSACHUSETTS.

TURBINE WATER WHEEL.

Application filed November 16, 1920. Serial No. 424,384.

*To all whom it may concern:*

Be it known that I, RODERICK WALLACE McNEILL, a citizen of the United States, residing at Boston, in the county of Suffolk and State of Massachusetts, have invented certain new and useful Improvements in Turbine Water Wheels; and I do hereby declare the following to be a full, clear, and exact description of the invention, such as will enable others skilled in the art to which it appertains to make and use the same.

This invention relates to a turbine water wheel adapted to be used in the generation of power from tidal flow.

The object of the invention is to provide a turbine water wheel of novel and improved construction particularly adapted to be used for the efficient conversion of the power contained in both the outgoing and incoming tide into electrical energy.

To this end the invention consists in the construction hereinafter described and particularly pointed out in the claims.

Figure 1:
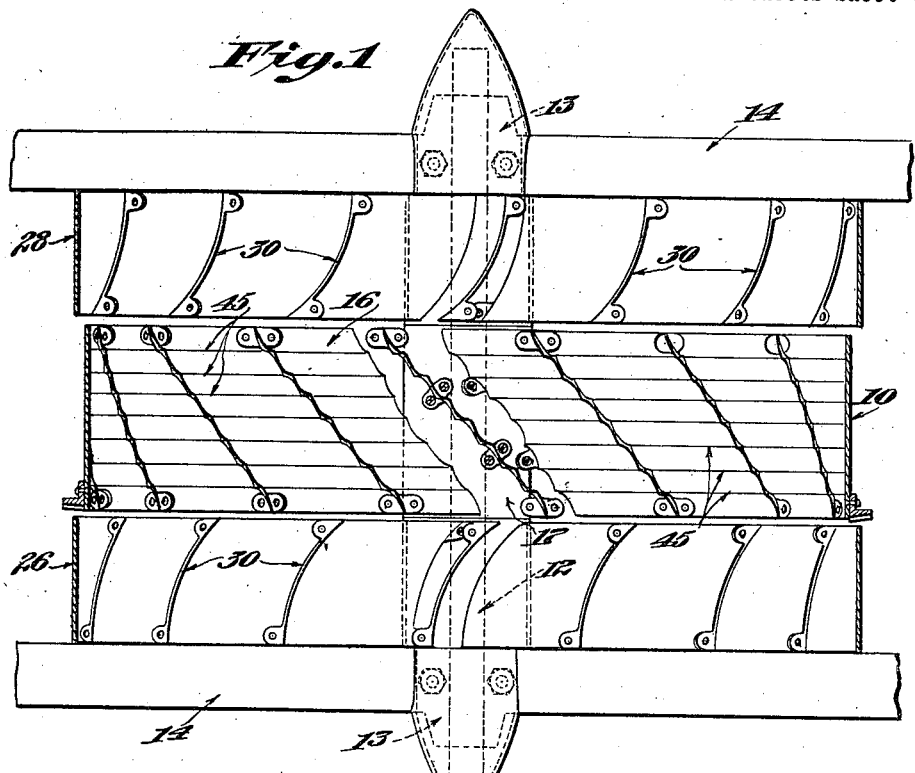
Figure 2:
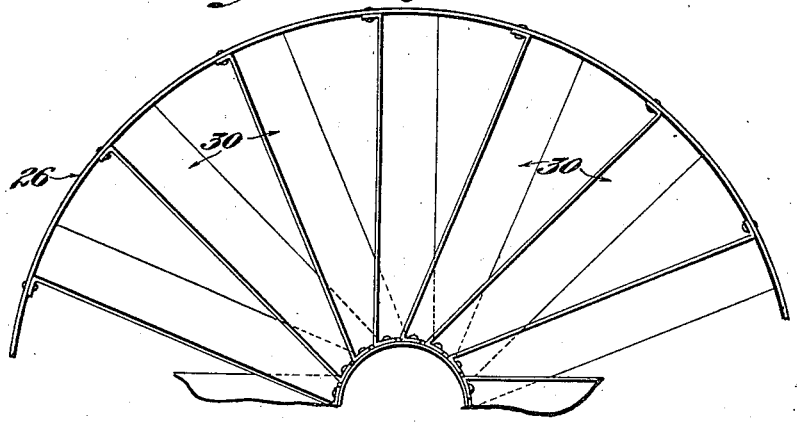
Figure 3:
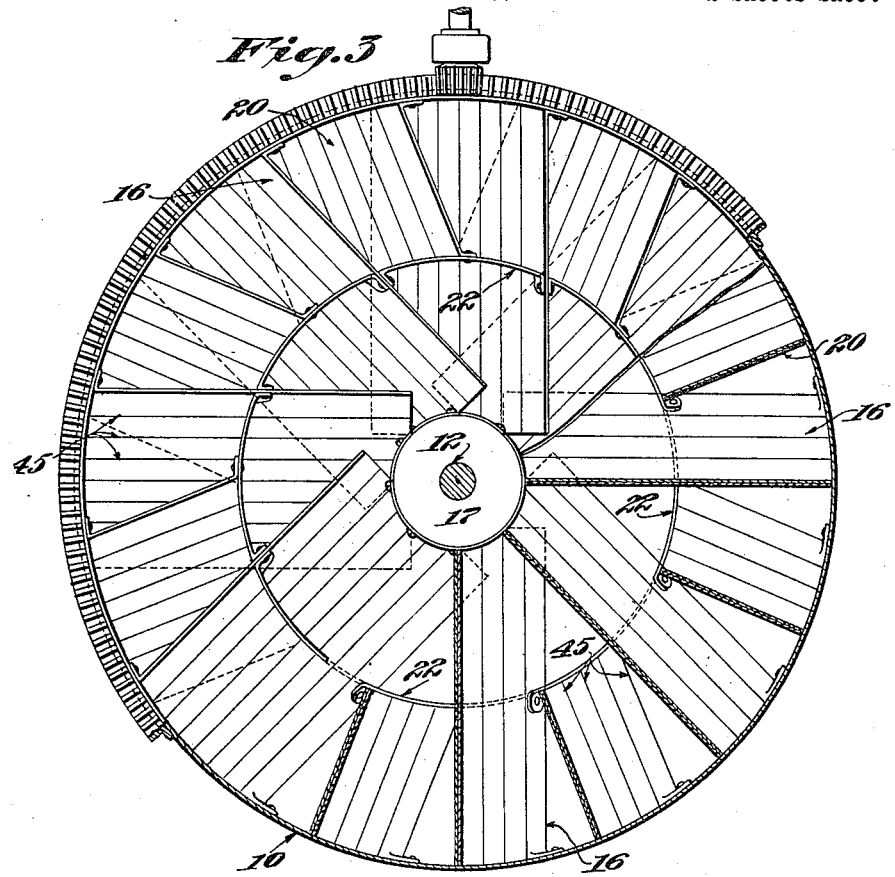
Figure 4:

In the drawings illustrating the preferred embodiment of the invention, Fig. 1 is a plan partly in section, showing the improved turbine water wheel; Fig. 2 is a side elevation of the upper portion of the guide members; Fig. 3 is a side elevation partly in section; and Fig. 4 is a sectional detail of one of the vanes showing the riffles.

In its preferred form, the improved turbine water wheel comprises, in general, a cylindrical drum mounted upon an axial shaft rotatably journaled in suitable supporting abutments. A plurality of radial vanes are mounted within the drum, being riveted at their outer ends to the inside of the cylindrical drum and at their inner ends to a hub through which the shaft is extended. The improved turbine water wheel is adapted to be placed within a conduit or sluice-way constructed and arranged to cause the tide to flow through the cylindrical drum under a pressure head to thereby turn the turbine water wheel as the tide flows through the same and across the surface of the radial vanes. Provision is also made for directing or guiding the flow of water as it enters the opposite ends of the water wheel upon either the outgoing or incoming tide in order to present the water in such direction with relation to the radial vanes that the maximum efficiency of transformation of power into rotations of the wheel is obtained from the water flow. Provision is also made for transforming the rotations of the wheel into electrical energy by gear and pinion power transmitting means.

The preferred embodiment of the invention is described as follows: The turbine water wheel comprises a cylindrical drum or casing 10 mounted upon a shaft 12 journaled in suitable bearings 13 in supporting members 14, preferably of steel. A plurality of radial vanes 16 are mounted within the drum, being riveted at their outer ends to the inside of the casing and at their inner ends to a hub 17 through which the shaft 12 is extended. These radial vanes 16 are inclined at an angle of substantially 45 degrees to the axis of the drum and are adapted to deflect the flow of water through the drum 10 in such manner as to cause power thereof to be transferred into rotations of the drum. A plurality of half vanes 20 are provided between the outer ends of the radial vanes 16, being likewise inclined at substantially 45 degrees to the axis of the drum 10. These half vanes 20 are riveted to the inside of the drum 10 at their outer ends and at their inner ends to reenforcing members 22 interposed between the radial vanes 16 and riveted thereto in the manner illustrated in Fig. 3.

The improved turbine water wheel is adapted, when used for the purpose of generating power from tidal flow, to be submerged in a conduit or sluice-way. The construction of the conduit and sluice-way is preferably such as to conform to the contour of the cylindrical drum of the water wheel so as to cause all of the water passing through the sluice-way to pass through the cylindrical drum. Furthermore, the sluice-way and drum are located across an estuary in such position as to be completely submerged below the extreme low water mark of the particular estuary.

In order to enable the water wheel to be employed with maximum efficiency for the generation of power from both the incoming and outgoing tides as they flow in opposite directions through the sluice-way, provision is made for guiding the flow of the water as it enters the ends of the drum in such manner that it is caused to impinge against opposite sides of the inclined radial vanes 16 as to cause rotation of the water wheel. For this purpose auxiliary drums 26, 28 are disposed at each end of the cylindrical drum of the water wheel. These auxiliary drums are provided with a plurality of curved guiding members 30 which are radially disposed within the auxiliary drums and which function to guide the water entering from either end of the sluice-way to present it at substantially right angles to the opposite surfaces of the radial vanes of the water wheel. This construction is illustrated in plan in Fig. 1.

The design and construction of the surfaces of the vanes 30 of the turbine water wheel constitutes an important feature of the invention which enables the turbine water wheel to be successfully and practically employed for the purpose of generating power from the tidal flow. Of the factors which render the generation of power from the tidal flow extremely difficult from a commercial engineering point of view, the relatively small and varying working head of water under which a tidal water wheel is obliged to operate has heretofore presented the maximum difficulty. Because of the relatively small head of water under which it is possible to operate the tidal water wheel, designs of blades and vanes which have heretofore been proposed have enabled only a relatively small portion of the available power of the tide to be converted into electrical energy. In the present construction of turbine water wheel, the surfaces of each of the vanes are provided with a series of riffles 45. Referring to Fig. 4 in which the construction of one vane is illustrated in cross section, it will be noted that the vane is provided with seven riffles of uniform width and extending upon each surface of the vane in the general direction of the flow of the water across the vane. The curvature of the surface of the vane between adjacent riffles is preferably such as to cause the water flowing across the vane to be successively deflected first in a direction toward the vane and then in a direction away from the vane.

In the operation of the turbine water wheel, the riffled surfaces of the vanes appear to have the effect of utilizing the velocity of the water as well as the pressure head thereon for the purpose of rotation of the turbine water wheel. The exact explanation of the reason for the improved efficiency with the riffled form of vane is not at present understood but it is believed that because of the successive deflection of the water as it is traveling across the surface of the vane in a direction first toward the vane and then away from the vane, that the action of the water as it is leaving the vane is utilized, together with the impulse of the water thereon, to produce an increased turning effect upon the water wheel. In appearance, the action of the water with relation to the vanes in the operation of the turbine water wheel appears to be analogous to a gripping action between the water and the vanes.

It will be observed that the improved turbine water wheel may be manufactured economically, and is simple yet of durable construction.

While the preferred embodiment of the invention has been illustrated and described, it will be understood that the invention may be embodied in other forms within the scope of the following claims.

I claim:—

1. A turbine water wheel for use in generating power from tidal flow having a plurality of vanes across the surface of which the tide is caused to flow to cause rotations of the turbine water wheel, means for causing the flow of water across the surface of the vanes to be deflected toward and away from the vanes, and means for transmitting the rotation of the vanes to an electric generator.

2. A turbine water wheel for use in generating power from tidal flow having a plurality of vanes provided with riffles on the surfaces thereof across which the tide is caused to flow to cause rotation of the vanes, and means for transmitting the rotation of the vanes to an electric generator.

3. A turbine water wheel for use in generating power from tidal flow having a plurality of vanes provided with riffles on the surfaces thereof, means for guiding the flow of water across the vanes, and means for transmitting rotation of the vanes to an electric generator.

4. A turbine water wheel for use in generating power from tidal flow having a plurality of vanes arranged to be inclined at substantially 45 degrees to the flow of water through the turbine water wheel, and means for transmitting the rotation of the vanes to an electric generator, said vanes being provided with riffles on the surfaces thereof.

5. A turbine water wheel comprising a rotatable drum, a plurality of vanes within the drum, and means for transmitting the rotations of the drum to an electric generator, said vanes being provided with riffles on the surfaces thereof.

6. A turbine water wheel having a plurality of vanes inclined at an angle to the flow of the water through the turbine water wheel, said vanes being provided with riffles.

7. A turbine water wheel comprising a rotatable drum, a plurality of vanes within the drum inclined at an angle to the flow of water therethrough, said vanes being provided with riffles.

R. WALLACE McNEILL.